United States Patent
Yu et al.

(10) Patent No.: US 8,995,934 B2
(45) Date of Patent: Mar. 31, 2015

(54) WIRELESS COMMUNICATIONS CIRCUITRY WITH A TRIPLEXER FOR SEPARATING RADIO-FREQUENCY SIGNALS IN ADJACENT FREQUENCY BANDS

(71) Applicant: Apple Inc., Cupertino, CA (US)

(72) Inventors: Qishan Yu, San Diego, CA (US); James T. Yang, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 306 days.

(21) Appl. No.: 13/631,332

(22) Filed: Sep. 28, 2012

(65) Prior Publication Data

US 2013/0157717 A1 Jun. 20, 2013

Related U.S. Application Data

(60) Provisional application No. 61/570,705, filed on Dec. 14, 2011.

(51) Int. Cl.
*H04B 1/48* (2006.01)
*H04B 1/44* (2006.01)

(52) U.S. Cl.
CPC ........................................ *H04B 1/44* (2013.01)
USPC ............... 455/83; 455/73; 455/553.1; 455/78

(58) Field of Classification Search
CPC .................................... H04B 1/44; H04B 1/50
USPC ............. 455/73, 78, 80, 82, 83, 550.1, 552.1, 455/553.1
See application file for complete search history.

(56) References Cited

U.S. PATENT DOCUMENTS

| | | | |
|---|---|---|---|
| 6,876,840 B2 | 4/2005 | Shin et al. | |
| 8,283,995 B2 | 10/2012 | Okada et al. | |
| 2010/0131149 A1* | 5/2010 | Saugnac et al. | 701/33 |
| 2010/0279709 A1* | 11/2010 | Shahidi et al. | 455/456.2 |
| 2011/0159810 A1 | 6/2011 | Kenington et al. | |

(Continued)

FOREIGN PATENT DOCUMENTS

| | | |
|---|---|---|
| CN | 101895327 | 11/2010 |
| EP | 1511184 | 3/2005 |

(Continued)

OTHER PUBLICATIONS

Lum et al., U.S. Appl. No. 13/080,588, filed Apr. 5, 2012.

*Primary Examiner* — John J Lee
(74) *Attorney, Agent, or Firm* — Treyz Law Group; Michael H. Lyons

(57) ABSTRACT

A wireless electronic device may be used to communicate using multiple wireless standards in adjacent frequency bands. The wireless standards may include Wi-Fi® and cellular standards such as Long Term Evolution (LTE). The wireless electronic device may be provided with wireless communications circuitry that handles Wi-Fi® and cellular signals in adjacent frequency bands such as the Wi-Fi® 2.4 GHz frequency band and LTE bands 38 and 40. The wireless communications circuitry may include a triplexer interposed between transceiver circuitry and an antenna. The triplexer may be used to handle radio-frequency signals in adjacent frequency bands by separating the radio-frequency signals into signals associated with each frequency band. The triplexer may include filters that each pass signals in a respective one of the frequency bands between the transceiver circuitry and the antenna.

17 Claims, 7 Drawing Sheets

(56) References Cited

U.S. PATENT DOCUMENTS

2011/0234335 A1 9/2011 Khlat
2011/0292844 A1* 12/2011 Kwun et al. .................. 370/278
2012/0243449 A1 9/2012 He

FOREIGN PATENT DOCUMENTS

| EP | 2254252 | 11/2010 |
| EP | 2393205 | 12/2011 |
| TW | 201130247 | 9/2011 |

* cited by examiner

WIRELESS COMMUNICATIONS CIRCUITRY WITH A TRIPLEXER FOR SEPARATING RADIO-FREQUENCY SIGNALS IN ADJACENT FREQUENCY BANDS

This application claims priority to U.S. provisional patent application No. 61/570,705 filed Dec. 14, 2011, which is hereby incorporated by reference herein in its entirety.

BACKGROUND

This invention relates generally to electronic devices, and more particularly, to wireless electronic devices that communicate in adjacent frequency bands.

Electronic devices such as handheld electronic devices and other portable electronic devices are becoming increasingly popular. Examples of handheld devices include cellular telephones, handheld computers, media players, and hybrid devices that include the functionality of multiple devices of this type. Popular portable electronic devices that are somewhat larger than traditional handheld electronic devices include laptop computers and tablet computers.

Due in part to their mobile nature, portable electronic devices are often provided with wireless communications capabilities. For example, portable electronic devices may use long-range wireless communications to communicate with wireless base stations and may use short-range wireless communications links such as links for supporting the Wi-Fi® (IEEE 802.11) bands at 2.4 GHz and 5.0 GHz and the Bluetooth® band at 2.4 GHz.

Wireless electronic devices may be used to communicate using different wireless technologies at the same time. For example, a wireless electronic device may be used to communicate using Wi-Fi® and cellular technologies at the same time. It may be challenging to design wireless communications circuitry in a wireless electronic device to accommodate simultaneous communications using different technologies. For example, cellular signals can potentially interfere with Wi-Fi® signals. To avoid interference, conventional wireless electronic devices often use separate antennas for Wi-Fi® and cellular communications.

It would therefore be desirable to be able to provide electronic devices with improved wireless communications capabilities.

SUMMARY

A wireless electronic device may be used to communicate using different wireless standards in adjacent frequency bands. The wireless standards may include the Wi-Fi® standard and cellular standards such as Long Term Evolution (LTE). The wireless electronic device may be provided with wireless communications circuitry that handles Wi-Fi® and cellular signals in adjacent frequency bands such as the Wi-Fi® 2.4 GHz frequency band and LTE bands 38 and 40. The wireless electronic device may include transceiver circuitry used to simultaneously communicate in two or more of the adjacent frequency bands. For example, the transceiver circuitry may be used to transmit and receive Wi-Fi signals in the Wi-Fi® 2.4 GHz band and transmit and receive cellular signals in LTE band 38 at the same time.

The wireless communications circuitry may include a triplexer interposed between the transceiver circuitry and an antenna. The triplexer may be used to handle wireless communications in adjacent frequency bands by separating wireless communications into signals associated with each frequency band. The triplexer may include first, second, and third filters that each pass radio-frequency signals in a respective one of the adjacent frequency bands. The radio-frequency signals may be passed to transceiver circuitry such as a cellular transceiver and a Wi-Fi® transceiver. For example, the first filter may pass radio-frequency signals in LTE band 40, the second filter may pass radio-frequency signals in the 2.4 GHz Wi-Fi® frequency band, and the third filter may pass radio-frequency signals in LTE band 38. In this scenario, the first and third filters may be coupled to cellular transceiver circuitry that handles radio-frequency signals in LTE bands 38 and 40 whereas the second filter may be coupled to Wi-Fi® transceiver circuitry that handles Wi-Fi® signals.

Further features of the present invention, its nature and various advantages will be more apparent from the accompanying drawings and the following detailed description.

DETAILED DESCRIPTION

The present invention relates generally to wireless communications, and more particularly, to wireless electronic devices with triplexer circuitry.

The wireless electronic devices may be portable electronic devices such as laptop computers or small portable computers of the type that are sometimes referred to as ultraportables. Portable electronic devices may include tablet computing devices (e.g., a portable computer that includes a touch-screen display). Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be handheld electronic devices.

The wireless electronic devices may be, for example, cellular telephones, media players with wireless communications capabilities, handheld computers (also sometimes called personal digital assistants), remote controllers, global positioning system (GPS) devices, tablet computers, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
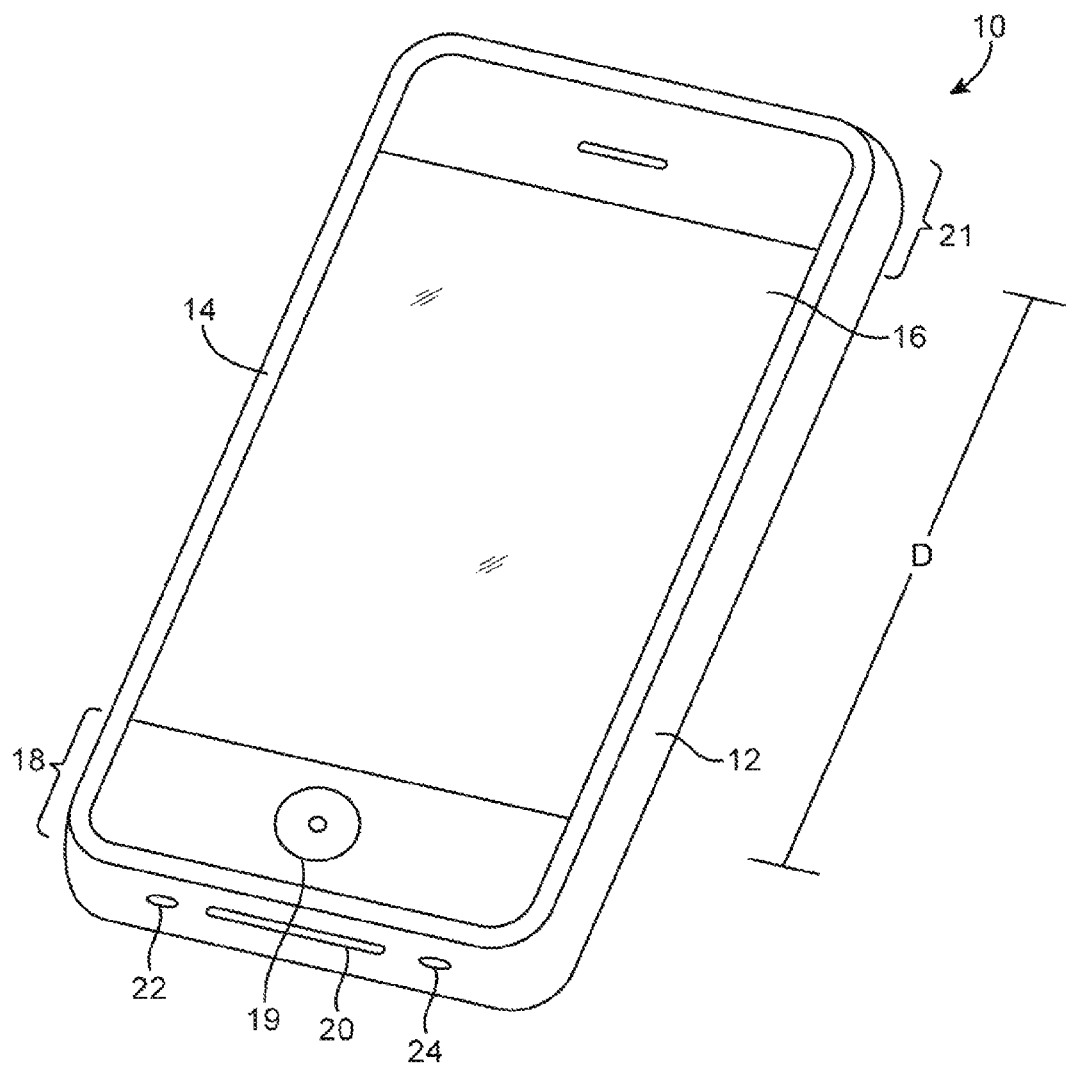
FIG. 1 is a perspective view of an illustrative electronic device in accordance with an embodiment of the present invention.

An illustrative wireless electronic device in accordance with an embodiment of the present invention is shown in FIG. 1. Device 10 of FIG. 1 may be, for example, a portable electronic device.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive antenna elements that are located in proximity to housing 12 is not disrupted. Housing 12 or portions of housing 12 may also be formed from conductive materials such as metal. An illustrative housing material that may be used is anodized aluminum. Aluminum is relatively light in weight and, when anodized, has an attractive insulating and scratch-resistant surface. If desired, other metals can be used for the housing of device 10, such as stainless steel, magnesium, titanium, alloys of these metals and other metals, etc. In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10. To facilitate electrical contact between an anodized aluminum housing and other metal components in device 10, portions of the anodized surface layer of the anodized aluminum housing may be selectively removed during the manufacturing process (e.g., by laser etching).

Housing 12 may have a bezel 14. The bezel 14 may be formed from a conductive material and may serve to hold a display or other device with a planar surface in place on device 10. As shown in FIG. 1, for example, bezel 14 may be used to hold display 16 in place by attaching display 16 to housing 12.

Display 16 may be a liquid crystal diode (LCD) display, an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 24 and 22 may, if desired, form microphone and speaker ports. In the example of FIG. 1, display screen 16 is shown as being mounted on the front face of portable electronic device 10, but display screen 16 may, if desired, be mounted on the rear face of portable electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Device 10 may also have audio and video jacks that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Examples of locations in which antenna structures may be located in device 10 include region 18 (e.g., a first antenna) and region 21 (e.g., a second antenna). Region 18 may be separated from region 21 by a distance D. These are merely illustrative examples. Any suitable portion of device 10 may be used to house antenna structures for device 10 if desired.

Figure 2:
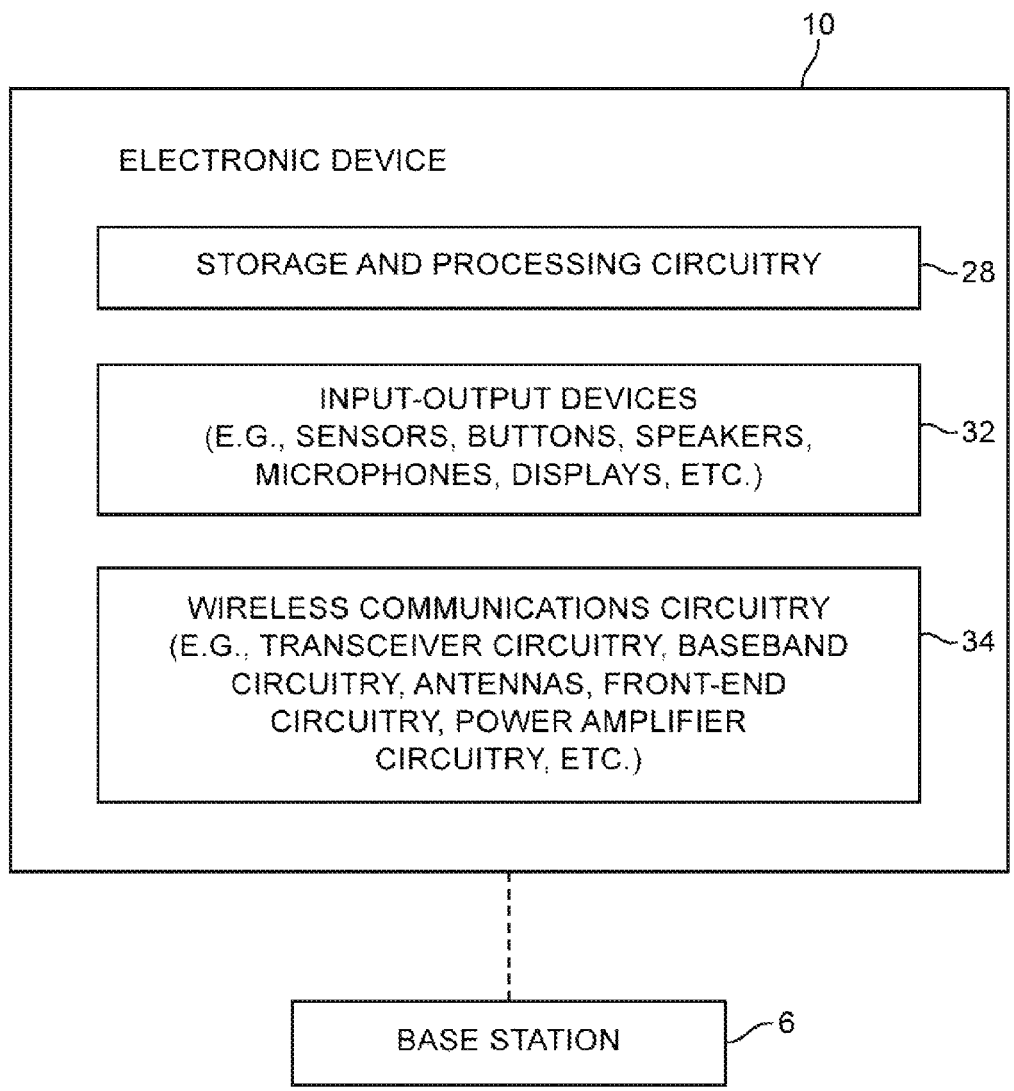
FIG. 2 is a schematic diagram of an illustrative electronic device with wireless communications circuitry in accordance with an embodiment of the present invention.

Wireless electronic devices such as device 10 of FIG. 2 may be provided with wireless communications circuitry. The wireless communications circuitry may be used to support long-range wireless communications such as communications in cellular telephone frequency bands (e.g., ranges of frequencies associated with wireless standards or protocols). Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, the 2500 MHz band, and other frequency bands. Each long-range band may be associated with a range of frequencies. For example, the 850 MHz band may be associated with frequency range 824-849 MHz and the 2500 MHz band may be associated with frequency range 2500-2570 MHz. Examples of wireless standards or protocols that are associated with the cellular telephone frequency bands include Global System for Mobile (GSM) communications standard, the Universal Mobile Telecommunications System (UMTS) standard, and standards that use technologies such as Code Division Multiple Access, time division multiplexing, frequency division multiplexing, etc. The long-range bands used by device 10 may include the so-called LTE (Long Term Evolution) bands. The LTE bands are numbered (e.g., 1, 2, 3, etc.) and are sometimes referred to as E-UTRA operating bands. As an example, LTE band 7 corresponds to uplink frequencies between 2.5 GHz and 2.57 GHz (e.g., frequencies used to transmit wireless signals to a base station) and downlink frequencies between 2.62 GHz and 2.69 (e.g., frequencies used to receive wireless signals from a base station).

Long-range signals such as signals associated with satellite navigation bands may be received by the wireless communications circuitry of device 10. For example, device 10 may use wireless circuitry to receive signals in the 1575 MHz band associated with Global Positioning System (GPS) communications. Short-range wireless communications may also be supported by the wireless circuitry of device 10. For example, device 10 may include wireless circuitry for handling local area network links such as WiFi® links at 2.4 GHz and 5 GHz, Bluetooth links and Bluetooth Low Energy links at 2.4 GHz, etc.

As shown in FIG. 2, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to radio-frequency transmission and reception such as selection of communications frequencies, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as Wi-Fi®), protocols for other short-range wireless communications links such as the Bluetooth protocol, cellular telephone protocols, MIMO (multiple input multiple output) protocols, antenna diversity protocols, etc. Wireless communications operations such as communications frequency selection operations may be controlled using software stored and running on device 10 (e.g., stored and running on storage and processing circuitry 28).

Electronic device 10 may include wireless communications circuitry 34 for communicating wirelessly with external equipment. Therefore, electronic device 10 may sometimes be referred to as a wireless device or a wireless electronic device. Wireless communications circuitry 34 may include radio-frequency (RF) transceiver circuitry formed from one or more integrated circuits, baseband circuitry, power amplifier circuitry, low-noise input amplifiers, passive RF components, one or more antennas, transmission lines, and other circuitry such as front-end circuitry for handling RF wireless signals. Wireless signals can also be sent using light (e.g., using infrared communications).

Wireless communications circuitry 34 may include radio-frequency transceiver circuitry for handling various radio-frequency communications bands. For example, circuitry 34 may include transceiver circuitry that handles 2.4 GHz and 5 GHz bands for WiFi (IEEE 802.11) communications and/or handles the 2.4 GHz band for Bluetooth communications. Circuitry 34 may include cellular telephone transceiver circuitry for handling wireless communications in cellular telephone bands such as at 850 MHz, 900 MHz, 1800 MHz, 1900 MHz, 2100 MHz, the LTE bands, and other bands (as examples). Circuitry 34 may handle voice data and non-voice data. If desired, wireless communications circuitry 34 may include global positioning system (GPS) receiver equipment for receiving GPS signals at 1575 MHz or for handling other satellite positioning data.

Wireless communications circuitry 34 may be configured by storage and processing circuitry 28 to communicate with base station 6 via cellular standards such as GSM, UMTS, LTE, etc. For example, wireless communications circuitry 34 may send and receive radio-frequency signals from base station 6 on radio-frequency bands such as LTE bands 38 and 40. Base station 6 may provide device 10 with access to a cellular network.

Device 10 may be provided with input-output devices 32 such as sensors, buttons, speakers, microphones, displays, and other input-output devices that accommodate user interaction with device 10. For example, input-output devices 32 may include button 19 and display 16.

Wireless communications circuitry 34 may include one or more antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Antenna diversity schemes may be implemented in which multiple redundant antennas are used in handling communications for a particular band or bands. In an antenna diversity scheme, storage and processing circuitry 28 may select which antenna to use in real time based on signal strength measurements or other data. For example, storage and processing circuitry 28 may select which antenna to use for LTE communications with a base station. In multiple-input-multiple-output (MIMO) schemes, multiple antennas may be used to transmit and receive multiple data streams, thereby enhancing data throughput.

Figure 3:
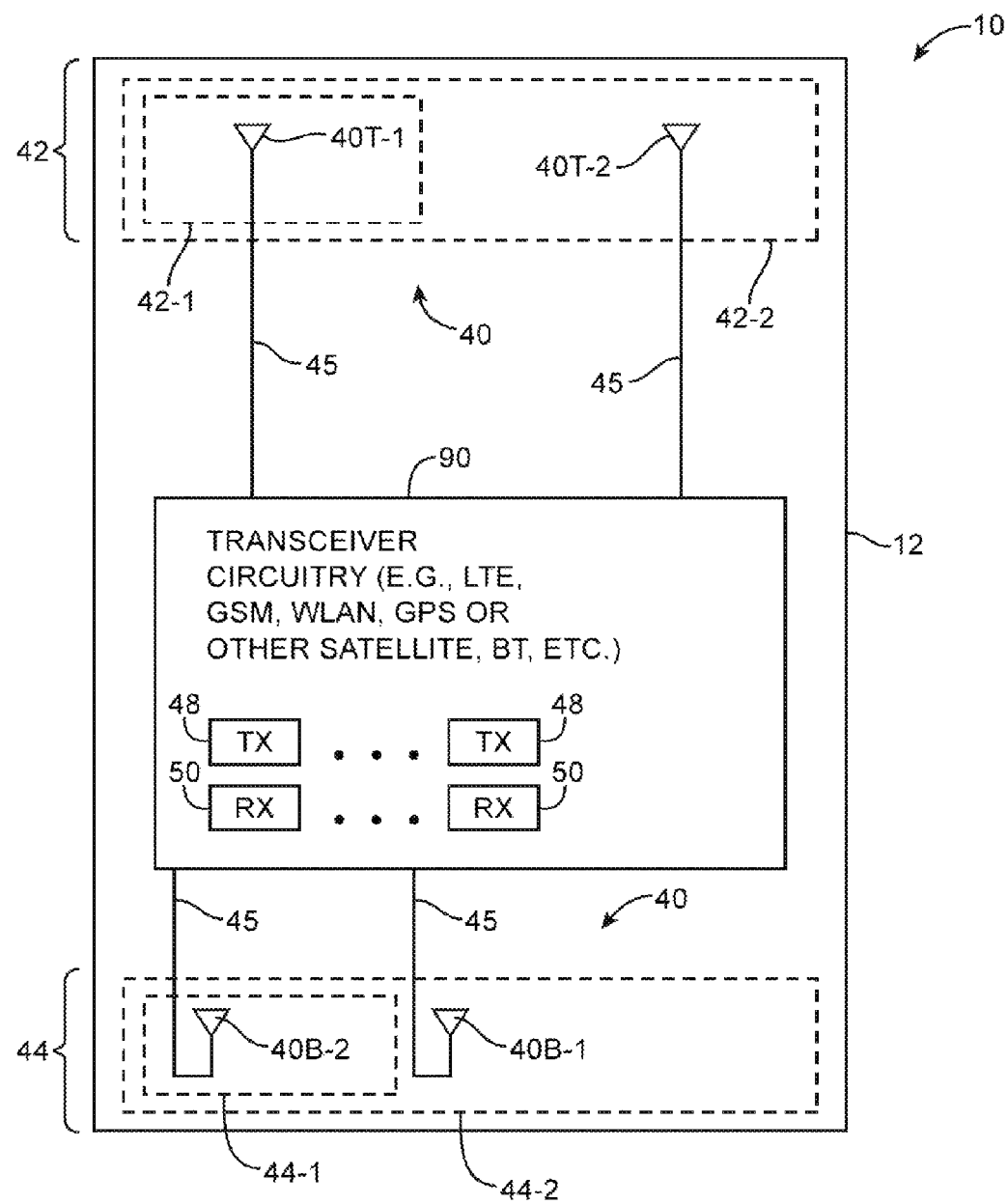
FIG. 3 is a diagram showing how radio-frequency transceiver circuitry may be coupled to one or more antennas within an electronic device in accordance with an embodiment of the present invention.

Illustrative locations in which antennas 40 may be formed in device 10 are shown in FIG. 3. As shown in FIG. 3, electronic device 10 may have a housing such as housing 12. Housing 12 may include plastic walls, metal housing structures, structures formed from carbon-fiber materials or other composites, glass, ceramics, or other suitable materials.

Housing 12 may be formed using a single piece of material (e.g., using a unibody configuration) or may be formed from a frame, housing walls, and other individual parts that are assembled to form a completed housing structure. The components of device 10 that are shown in FIG. 1 may be mounted within housing 12. Antenna structures 40 may be mounted within housing 12 and may, if desired, be formed using parts of housing 12. For example, housing 12 may include metal housing sidewalls, peripheral conductive members such as band-shaped members (with or without dielectric gaps), conductive bezels, and other conductive structures that may be used in forming antenna structures 40.

As shown in FIG. 3, antenna structures 40 may be coupled to transceiver circuitry 90 by paths such as paths 45. Paths 45 may include transmission line structures such as coaxial cables, microstrip transmission lines, stripline transmission lines, etc. Paths 45 may also include impedance matching circuitry, filter circuitry, and switching circuitry. Impedance matching circuitry may be used to ensure that antennas 40 are efficiently coupled to transceiver circuitry 90 in communications bands of interest. Filter circuitry may be used to implement frequency-based multiplexing circuits such as diplexers, duplexers, and triplexers. Switching circuitry may be used to selectively couple antennas 40 to desired ports of transceiver circuitry 90. For example, in one operating mode a switch may be configured to route one of paths 45 to a given antenna and in another operating mode the switch may be configured to route a different one of paths 45 to the given antenna. The use of switching circuitry between transceiver circuitry 90 and antennas 40 allows device 10 to support multiple communications bands of interest with a limited number of antennas.

In a device such as a cellular telephone that has an elongated rectangular outline, it may be desirable to place antennas 40 at one or both ends of the device. As shown in FIG. 3, for example, some of antennas 40 may be placed in upper end region 42 of housing 12 and some of antennas 40 may be placed in lower end region 44 of housing 12. The antenna structures in device 10 may include a single antenna in region 42, a single antenna in region 44, multiple antennas in region 42, multiple antennas in region 44, or may include one or more antennas located elsewhere in housing 12.

Antenna structures 40 may be formed within some or all of regions such as regions 42 and 44. For example, an antenna such as antenna 40T-1 may be located within region 42-1 or an antenna such as antenna 40T-2 may be formed that fills some or all of region 42-1. An antenna such as antenna 40B-1 may fill some or all of region 44-2 or an antenna such as antenna 40B-2 may be formed in region 44-1. These types of arrangements need not be mutually exclusive. For example, region 44 may contain a first antenna such as antenna 40B-1 and a second antenna such as antenna 40B-2.

Transceiver circuitry 90 may contain transmitters such as transmitters 48 and receivers such as receivers 50. Transmitters 48 and receivers 50 may be implemented using one or more integrated circuits (e.g., cellular telephone communications circuits, wireless local area network communications circuits, circuits for Bluetooth® communications, circuits for receiving satellite navigation system signals). Transceiver circuitry 90 may be formed with associated power amplifier circuits for increasing transmitted signal power, low noise amplifier circuits for increasing signal power in received signals, other suitable wireless communications circuits, and combinations of these circuits.

Figure 4:
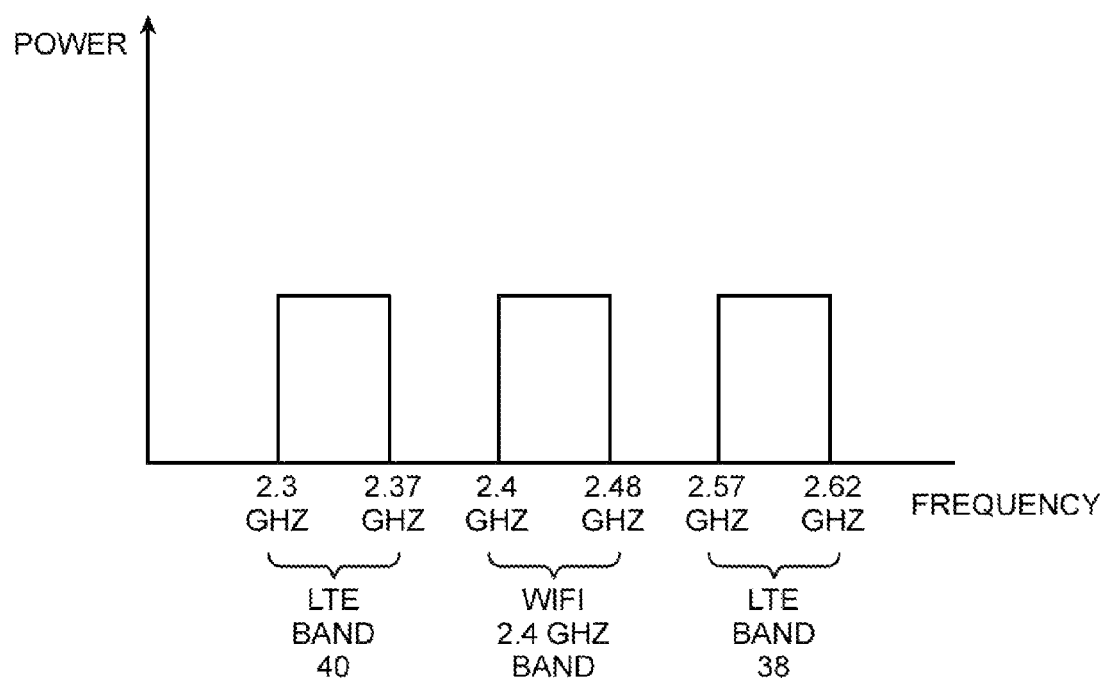
FIG. 4 is an illustrative diagram showing how cellular frequency bands may be adjacent to Wi-Fi® frequency bands in accordance with an embodiment of the present invention.

Wireless electronic devices such as device 10 may be used for simultaneous communications in adjacent frequency bands. FIG. 4 shows an illustrative diagram in which device 10 may be used to communicate in the Wi-Fi® 2.4 GHz frequency band and LTE bands 38 and 40. Radio-frequency signals may be transmitted in the frequency bands at selected power levels.

As shown in FIG. 4, the Wi-Fi® 2.4 GHz frequency band may correspond to a frequency range of about 2.4 GHz to 2.48 GHz, LTE band 38 may correspond to a frequency range of about 2.57 GHz to 2.62 GHz, and LTE band 40 may correspond to a frequency range of about 2.3 GHz to 2.37 GHz. LTE bands 38 and 40 may be adjacent to the Wi-Fi® 2.4 GHz frequency band.

Device 10 may be used for simultaneous communications using the LTE bands and the Wi-Fi® 2.4 GHz frequency band. For example, device 10 may transmit and receive Wi-Fi signals in the Wi-Fi® 2.4 GHz frequency band and cellular signals in LTE band 40 at the same time. It may be desirable to accommodate wireless communications in adjacent frequency bands such as the Wi-Fi® 2.4 GHz frequency band and LTE bands 38 and 40 with a single antenna (e.g., to reduce the number of antennas that are used to accommodate Wi-Fi® and cellular communications, thereby more efficiently using antenna resources).

Figure 5:
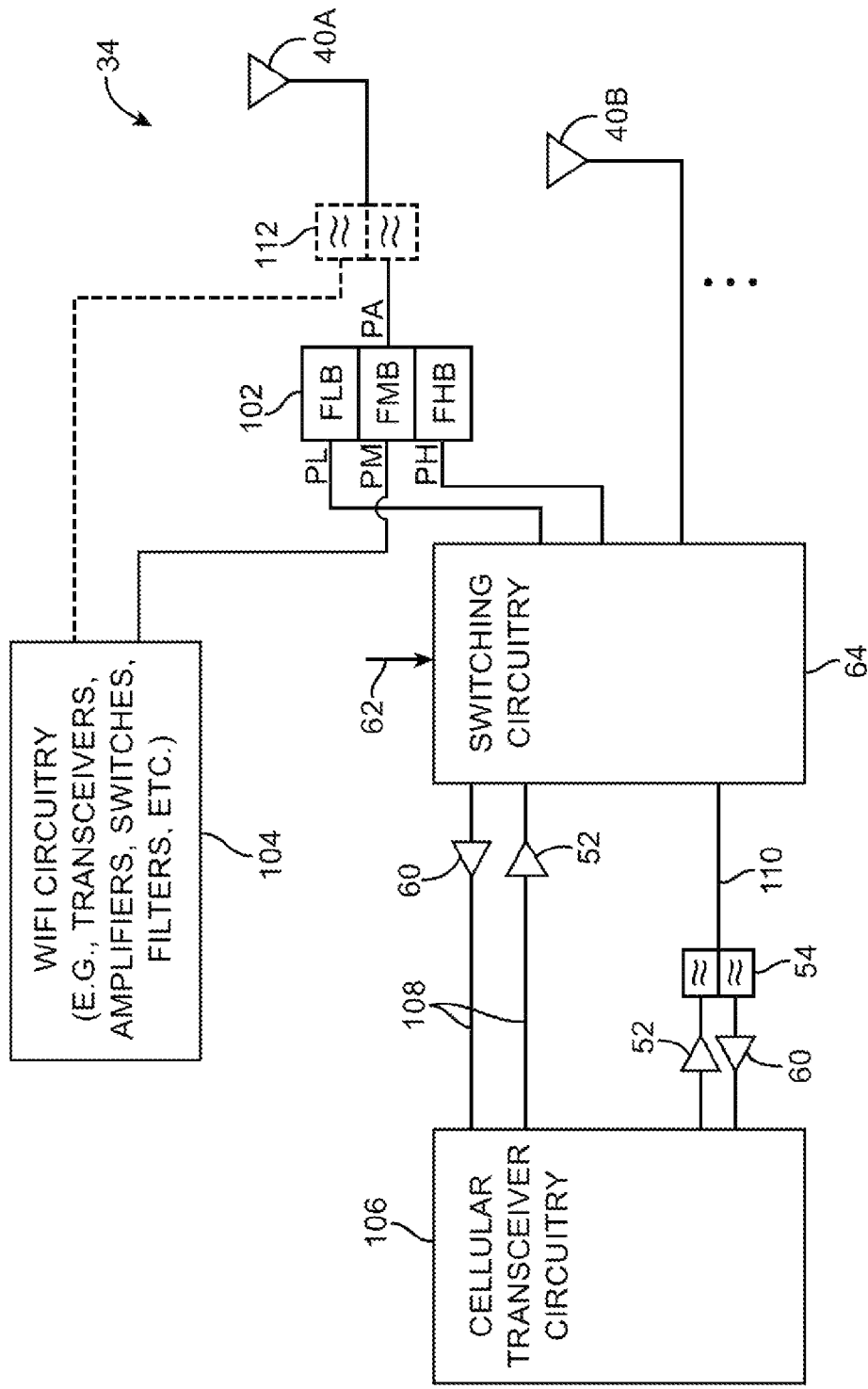
FIG. 5 is an illustrative diagram of wireless communications circuitry with triplexer circuitry in accordance with an embodiment of the present invention.

FIG. 5 is a diagram showing how wireless communications circuitry 34 may be provided with triplexer 102 for accommodating wireless communications in multiple adjacent frequency bands. As shown in FIG. 5, triplexer 102 may have filters FLB, FMB, and FHB and ports (terminals) PL, PM, PH, and PA. Port PA may be coupled to antenna 40A. Filter FLB may be a low pass filter. Filter FMB may be a band pass filter. Filter FHB may be high pass filter. These examples are merely illustrative. If desired, filters FLB and FHB may be band pass filters.

Ports PL, PM, and PH may be associated with respective frequency bands. Port PM may be associated with a frequency band that is lower than the frequency band of port PH and higher than the frequency band of port PL (e.g., the frequencies associated with port PL may be lower than the frequencies associated with port PM and the frequencies associated with port PM may be lower than the frequencies associated with port PH). Filters FLB, FMB, and FHB may partition wireless communications into radio-frequency signals corresponding to each frequency band. For example, port PL may be associated with LTE band 40, port PH may be associated with LTE band 38, and port PM may be associated with the Wi-Fi® 2.4 GHz frequency band. In this scenario, filter FLB may route radio-frequency signals in LTE band 40 between port PA and port PL, filter FMB may route radio-frequency signals in the Wi-Fi® 2.4 GHz frequency band between port PA and port PM, and filter FHB may route radio-frequency signals in LTE band 38 between port PA and port PH.

Filters FLB, FMB, and FHB may help prevent interference between radio-frequency signals in the adjacent frequency bands by attenuating out-of-band signals. For example, filter FLB may attenuate signal harmonics associated with non-linear operation of switching circuitry 64 or other non-linear components (e.g., transistors) so that the signal harmonics do not reach Wi-Fi® circuitry 104. By reducing potential signal interference associated with simultaneous operation of WiFi circuitry 104 and cellular communications circuitry such as switching circuitry 64 and cellular transceiver circuitry 106, triplexer 102 may accommodate simultaneous communications using different technologies in multiple adjacent frequency bands (e.g., Wi-Fi® communications in the Wi-Fi® 2.4 GHz frequency band and LTE communications in LTE bands 38 and 40).

Cellular transceiver circuitry 106 may accommodate multiple different cellular standards and protocols. As an example, circuitry 106 may transmit and receive radio-frequency signals using Long Term Evolution-Frequency Division Duplexing (LTE-FDD) via path 110. In this scenario, duplexer 54 may be used to separate received and transmitted signals based on frequency. As another example, circuitry 106 may transmit and receive radio-frequency signals using Long Term Evolution-Time Division Duplexing (LTE-TDD). In this scenario, transmitted and received signals may be routed between cellular transceiver circuitry 106 and switching circuitry 64 via separate paths 108.

Transmitted radio-frequency signals may be amplified by power amplifiers 60 to ensure that the radio-frequency signals are transmitted at a sufficient strength (e.g., at a power level sufficient for reception by other wireless devices or at a base station). Received radio-frequency signals may be amplified by low noise amplifiers 52 to ensure that the radio-frequency signals have sufficient power to be processed by the device (e.g., processed by baseband circuitry).

Switching circuitry 64 may be configured (e.g., controlled) to route radio-frequency signals between cellular transceiver circuitry 106 and antennas 40A and 40B. Switching circuitry 64 may be controlled via path 62 using control circuitry such as baseband circuitry and/or storage and processing circuitry 28. The radio-frequency signals may be routed so that signals in each frequency band are passed along appropriate signal paths. For example, frequency bands associated with LTE-TDD protocols may be routed through paths 108, whereas frequency bands associated with LTE-FDD protocols may be routed through paths 110.

If desired, switching circuitry 64 may be controlled to perform antenna diversity schemes such as antenna transmit diversity, antenna receive diversity, or other forms of antenna diversity in which radio-frequency signals are routed to a selected one (or more) antennas such as antennas 40A and 40B. For example, switching circuitry 62 may be configured to route radio-frequency transmit signals on paths 108 to a selected one of antennas 40A and 40B. As another example, switching circuitry 62 may be controlled via path 62 to route received signals from a selected one of antennas 40A and 40B to cellular transceiver circuitry 106. In this scenario, the antenna may be selected based on receive signal strength of each antenna. As another example, the switching circuitry may be operable in a first configuration in which the cellular transceiver circuitry is coupled to antenna 40A (e.g., paths 108 or 110 are coupled to ports PL and/or PH) and in a second configuration in which the cellular transceiver circuitry is coupled to antenna 40B (e.g., paths 108 or 110 are coupled to antenna 40B).

If desired, optional filter circuitry 112 (e.g., a diplexer) may be interposed between triplexer 102 and antenna 40A. Filter circuitry 112 may include combinations of low pass, high pass, and/or band pass filters that handle additional frequency bands. For example, circuitry 112 may include a high pass filter that routes radio-frequency signals in the Wi-Fi® 5 GHz band between Wi-Fi® circuitry 104 and antenna 40A and routes radio-frequency signals associated with triplexer 102 (e.g., signals at frequencies lower than 5 GHz) between triplexer 102 and antenna 40A.

Figure 6A:
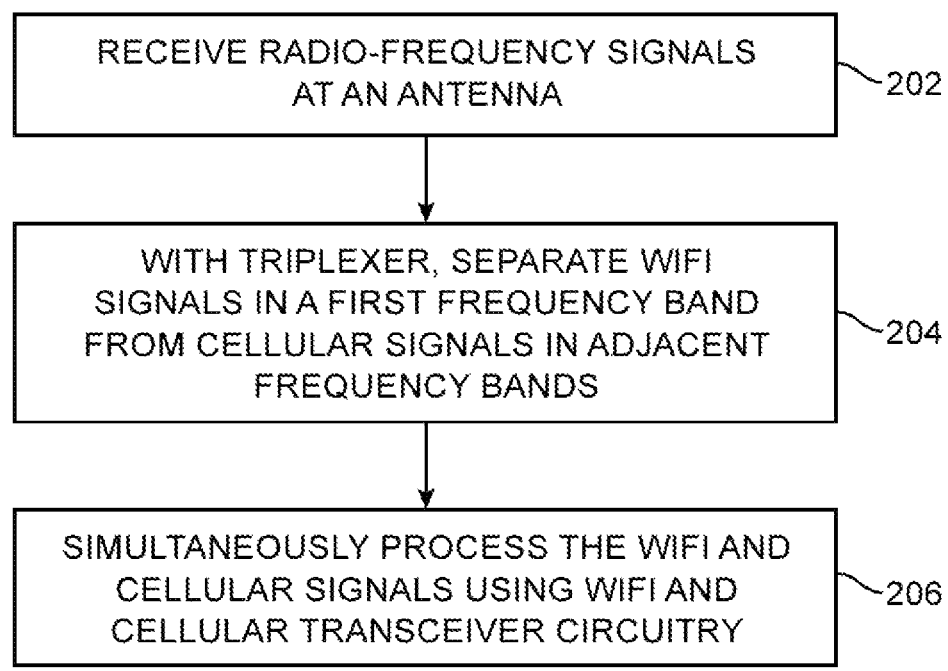
FIG. 6A is a flowchart of illustrative steps that may be performed to receive radio-frequency signals using triplexer circuitry in accordance with an embodiment of the present invention.
Figure 6B:
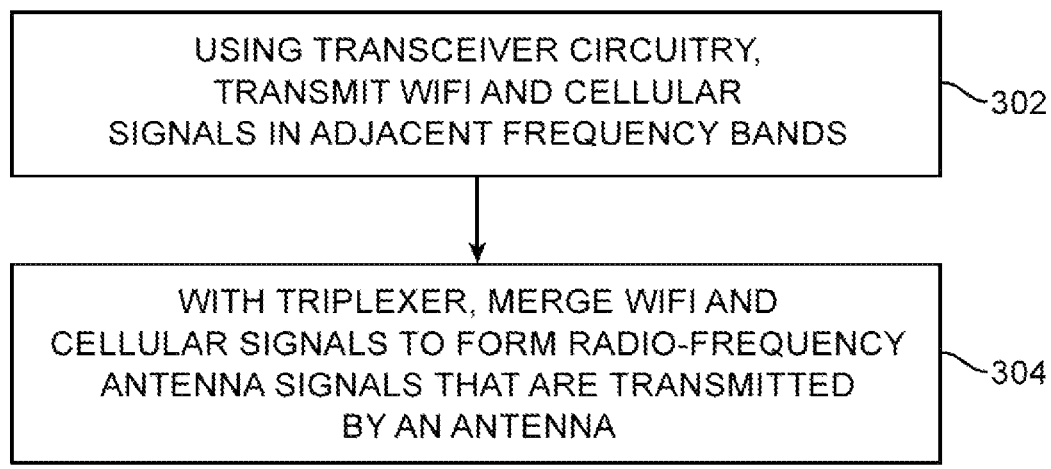
FIG. 6B is a flowchart of illustrative steps that may be performed to transmit radio-frequency signals using triplexer circuitry in accordance with an embodiment of the present invention.

FIGS. 6A and 6B are flowcharts of illustrative steps that may be performed by a wireless electronic device such as device 10 to use triplexer circuitry to handle radio-frequency signals in adjacent frequency bands. If desired, the illustrative steps of FIG. 6A may be performed in parallel with the steps of FIG. 6B (e.g., to receive and transmit radio-frequency signals at the same time). In the examples of FIGS. 6A and 6B, the frequency bands are associated with Wi-Fi® and cellular standards. These examples are merely illustrative. If desired, device 10 may use triplexer circuitry to separate radio-frequency signals in adjacent frequency bands for any wireless technologies or standards.

FIG. 6A is a flowchart of illustrative steps that may be performed by a wireless electronic device to receive radio-frequency signals in adjacent frequency bands using triplexer circuitry.

In step 202, radio-frequency signals may be received at an antenna such as antenna 40A of FIG. 5. The radio-frequency signals may include signals associated with Wi-Fi® frequency bands and signals associated with cellular frequency bands that are adjacent to the Wi-Fi® frequency bands. For example, the radio-frequency signals may include Wi-Fi® signals in the Wi-Fi® 2.4 GHz frequency band and cellular signals in LTE bands 38 and/or 40. If desired, filter circuitry such as diplexer 112 may be used to support signals in additional frequency bands. For example, signals in the Wi-Fi® 5 GHz frequency band may be passed directly to Wi-Fi® circuitry 104 by a high pass filter in diplexer 112, whereas other signals may be passed to triplexer 102.

In step 204, triplexer circuitry such as triplexer 102 may be used to separate Wi-Fi® signals in a first frequency band (e.g., the Wi-Fi® 2.4 GHz frequency band) from cellular signals in frequency bands adjacent to the first frequency band (e.g., signals in LTE bands 38 or 40). For example, filter FMB may be used to isolate radio-frequency signals in the Wi-Fi® 2.4 GHz frequency band, filter FLB may be used to isolate radio-frequency signals in LTE band 40, and filter FHB may be used to isolate radio-frequency signals in LTE band 38. Each filter may pass radio-frequency signals in a corresponding frequency band between the antenna and a desired transceiver circuit. For example, filter FMB may pass signals between Wi-Fi circuitry 104 and antenna 40A, filter FLB may pass signals between antenna 40A and cellular transceiver circuitry 106, and filter FHB may pass signals between antenna 40A and cellular transceiver circuitry 106.

In step 206, the device may simultaneously process the Wi-Fi® and cellular signals using transceiver circuitry (e.g., by retrieving data from the Wi-Fi® and cellular signals). The transceiver circuitry may include separate Wi-Fi® and cellular transceivers or may be formed as a single integrated circuit.

FIG. 6B is a flowchart of illustrative steps that may be performed by a wireless electronic device to transmit radio-frequency signals in adjacent frequency bands using triplexer circuitry.

In step 302, device 10 may use transceiver circuitry to transmit radio-frequency signals in adjacent frequency bands. In the example of FIG. 6B, Wi-Fi® and cellular signals may be transmitted in the Wi-Fi® 2.4 GHz frequency band and LTE bands 38 or 40.

In step 304, triplexer circuitry such as triplexer 102 may be used to merge the Wi-Fi® and cellular signals to form radio-frequency antenna signals that are routed to an antenna such as antenna 40A. The antenna may be used to wirelessly transmit the radio-frequency antenna signals.

The foregoing is merely illustrative of the principles of this invention and various modifications can be made by those skilled in the art without departing from the scope and spirit of the invention.

What is claimed is:

1. A wireless electronic device, comprising:
   an antenna;
   a first transceiver circuit;
   a second transceiver circuit; and a triplexer coupled to the antenna, wherein the triplexer comprises:
  a first filter configured to pass radio-frequency signals in a first frequency band between the antenna and the first transceiver circuit;
  a second filter configured to pass radio-frequency signals in a second frequency band between the antenna and the first transceiver circuit; and
  a third filter configured to pass radio-frequency signals in a third frequency band between the antenna and the second transceiver circuit, wherein the first filter comprises a high pass filter, the second filter comprises a low pass filter, and the third filter comprises a band pass filter.

2. The wireless electronic device defined in claim 1 wherein the first transceiver circuit comprises a cellular transceiver circuit.

3. The wireless electronic device defined in claim 2 wherein the third frequency band is adjacent to the first and second frequency bands, wherein the cellular transceiver circuit comprises a Long-Term Evolution transceiver circuit, and wherein the first filter is configured to pass radio-frequency signals in Long-Term Evolution Band 40.

4. The wireless electronic device defined in claim 3 wherein the second filter is configured to pass radio-frequency signals in Long-Term Evolution Band 38.

5. The wireless electronic device defined in claim 4 wherein the third filter is configured to pass Wi-Fi signals in a 2.4 GHz frequency band.

6. The wireless electronic device defined in claim 2 wherein the second transceiver circuit comprises a Wi-Fi transceiver circuit.

7. The wireless electronic device defined in claim 6 further comprising:
  a diplexer coupled between the triplexer and the antenna, wherein the diplexer is configured to pass radio-frequency signals in at least the first, second, and third frequency bands between the antenna and the triplexer and wherein the diplexer is configured to pass radio-frequency signals in a fourth frequency band between the antenna and the Wi-Fi transceiver.

8. The wireless electronic device defined in claim 7 wherein the diplexer comprises:
  a low pass filter configured to pass the radio-frequency signals in at least the first, second, and third frequency bands between the antenna and the triplexer; and
  a high pass filter configured to pass the radio-frequency signals in the fourth frequency band between the antenna and the Wi-Fi transceiver.

9. The wireless electronic device defined in claim 8 wherein the third frequency band comprises a 2.4 GHz Wi-Fi band, wherein the fourth frequency band comprises a 5 GHz Wi-Fi band, wherein the Wi-Fi transceiver is configured to wirelessly communicate in the 2.4 GHz frequency band using the third filter of the triplexer, and wherein the Wi-Fi transceiver is configured to wirelessly communicate in the 5 GHz frequency band using the high pass filter of the diplexer.

10. A method of operating a wireless electronic device having an antenna, the method comprising:
  with a triplexer, passing radio-frequency signals received by the antenna in a first frequency band to a first transceiver circuit;
  with the triplexer, passing radio-frequency signals received by the antenna in a second frequency band to the first transceiver circuit;
  with the triplexer, passing radio-frequency signals received by the antenna in a third frequency band to a second transceiver circuit;
  with a diplexer having first and second filters that are coupled between the antenna and the triplexer, passing radio-frequency signals between the antenna and the triplexer in at least the first, second, and third frequency bands using the first filter; and
  with the second filter, passing radio-frequency signals in a fourth frequency band between the triplexer and the second transceiver circuit.

11. The method defined in claim 10 wherein the first transceiver circuit comprises a cellular transceiver circuit, the method further comprising:
  with the cellular transceiver circuit, receiving the radio-frequency signals in the first frequency band; and
  with the cellular transceiver circuit, receiving the radio-frequency signals in the second frequency band.

12. The method defined in claim 11 wherein the second transceiver circuit comprises a Wi-Fi transceiver circuit, the method further comprising:
  with the Wi-Fi transceiver circuit, receiving the radio-frequency signals in the third frequency band.

13. The method defined in claim 10 wherein the triplexer comprises a low pass filter, a band pass filter, and a high pass filter, wherein passing the radio-frequency signals in the first frequency band comprises passing the radio-frequency signals in the first frequency band with the low pass filter, wherein passing the radio-frequency signals in the second frequency band comprises passing the radio-frequency signals in the second frequency band with the high pass filter, and wherein passing the radio-frequency signals in the third frequency band comprises passing the radio-frequency signals in the third frequency band with the band pass filter.

14. Wireless communications circuitry, comprising:
  an antenna;
  a triplexer, comprising:
    a first filter configured to pass cellular radio-frequency signals in a first frequency band from an antenna to a first triplexer port;
    a second filter configured to pass cellular radio-frequency signals in a second frequency band from the antenna to a second triplexer port; and
    a third filter configured to pass Wi-Fi radio-frequency signals in a third frequency band from the antenna to a third triplexer port;
  an additional antenna; and
  switching circuitry coupled to the antenna via the first and second triplexer ports, the additional antenna, and cellular transceiver circuitry that is coupled to the first and second triplexer ports, wherein the switching circuitry is operable in a first configuration in which the cellular transceiver circuitry is coupled to the antenna and in a second configuration in which the cellular transceiver circuitry is coupled to the additional antenna.

15. The wireless communications circuitry defined in claim 14 further comprising:
  Wi-Fi transceiver circuitry coupled to the third triplexer port.

16. The wireless communications circuitry defined in claim 14 further comprising:
  a diplexer coupled between the triplexer and the antenna, wherein the diplexer is configured to pass radio-frequency signals in at least the first, second and third frequency bands from the antenna to the triplexer and wherein the diplexer is further configured to pass radio-frequency signals in a fourth frequency band from the antenna to the Wi-Fi transceiver circuitry.

17. Wireless communications circuitry, comprising:
an antenna; and
a triplexer, comprising:
  a first filter configured to pass cellular radio-frequency signals in a first frequency band from an antenna to a first triplexer port;
  a second filter configured to pass cellular radio-frequency signals in a second frequency band from the antenna to a second triplexer port; and
  a third filter configured to pass Wi-Fi radio-frequency signals in a third frequency band from the antenna to a third triplexer port, wherein the first frequency band comprises a first cellular frequency band, the second frequency band comprises a second cellular frequency band, the third frequency band comprises a Wi-Fi frequency band, and the Wi-Fi frequency band is adjacent to the first and second cellular frequency bands.

* * * * *